Figure 1:
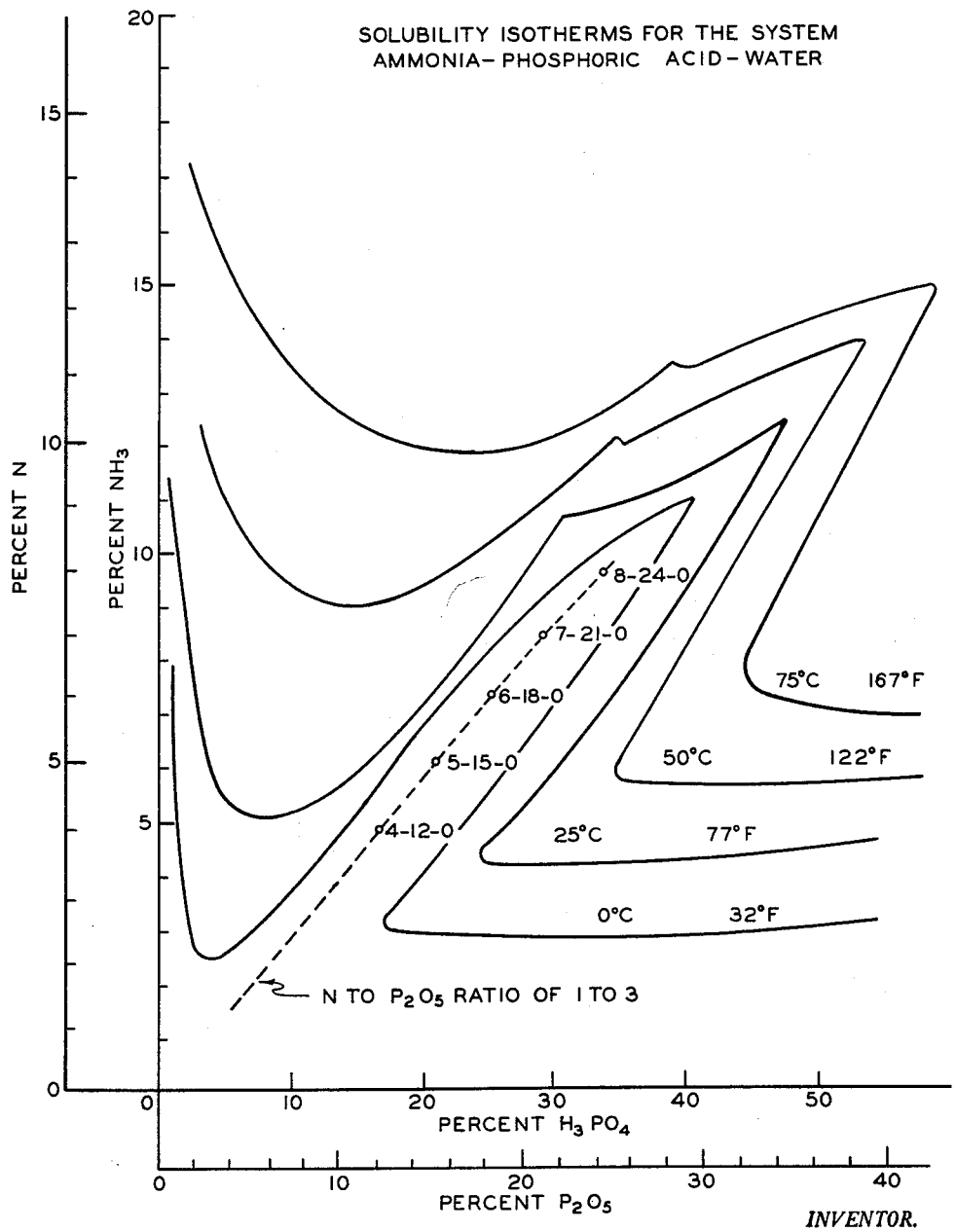

Dec. 15, 1959  C. E. FRANKLIN  2,917,380
LIQUID FERTILIZER WITH PREDETERMINED NITROGEN-PHOSPHORUS
PENTOXIDE-WATER RATIO
Filed April 9, 1956  2 Sheets-Sheet 2

INVENTOR.
C. E. FRANKLIN
BY
Hudson & Young
ATTORNEYS

United States Patent Office 2,917,380
Patented Dec. 15, 1959

2,917,380
LIQUID FERTILIZER WITH PREDETERMINED NITROGEN-PHOSPHORUS PENTOXIDE-WATER RATIO

Charles E. Franklin, Bartlesville, Okla., assignor to Phillips Petroleum Company, a corporation of Delaware Application April 9, 1956, Serial No. 576,898

7 Claims. (Cl. 71—34)

This invention relates to liquid fertilizers. In one of its aspects, this invention relates to the production of liquid fertilizers. In another of its aspects, it relates to an apparatus employed in the production of liquid fertilizers.

The practice of using solid fertilizers has been in existence for centuries. In recent years, however, the application of fertilizers in liquid form has experienced a tremendous growth which augurs well for the fertilizer industries. The recent upsurge in the use of liquid fertilizers can be attributed to a large extent to the numerous advantages attained with the production and application of liquid fertilizers, said advantages not being achieved in the production of solid fertilizers. The production of fertilizers in liquid form does not entail curing or bagging the materials or finished product. Caking and the necessity of water evaporation are eliminated which factors constitute a severe disadvantage in the solid fertilizer art. Liquid fertilizer plant equipment is relatively inexpensive and can be set up in the various locales to meet the demand. Also, liquid fertilizers can be more conveniently and accurately applied to the soil.

Therefore, one or more of the following objects will be attained by the practice of my invention.

An object of this invention is to provide an improved process for the production of liquid fertilizers.

Another object of this invention is to provide a novel apparatus for the production of liquid fertilizers.

A further object is to provide an improved process and apparatus for the production of a liquid fertilizer comprising an $NH_3$—$H_3PO_4$—$H_2O$ system.

A still further object is to provide a process wherein crystal formation is eliminated in the production of liquid fertilizers.

A yet further object is to provide a system wherein the equipment requirements are fulfilled in a novel and advantageous manner.

Numerous other objects of the present invention will be apparent to those skilled in the art from a consideration of the specification taken in conjunction with the accompanying drawing.

Broadly, this invention is directed to the production of liquid fertilizers and to the apparatus for producing same. A liquid fertilizer formulation comprising ammonia-phosphoric acid-water can have varying quantities of the basic and acidic components in an aqueous medium. Since the ammonia and phosphoric acid in an aqueous solution will react to give mono- and di-ammonium phosphate salts, etc., dissolved in an aqueous phase, a particular nomenclature relating to the above-mentioned liquid fertilizer system has been adapted to this relatively new field. For example, a liquid fertilizer known as an 8–24–0 grade signifies there has been enough nitrogen phosphorus compounds dissolved in water to produce a solution which contains 8 weight percent nitrogen and 24 weight percent phosphorus pentoxide. The third digit (zero) refers to the quantity of $K_2O$ present which in the above cited 8–24–0 grade would be 0 weight percent $K_2O$.

In the production of liquid fertilizers, it is desirable to produce what is known as a "neutral" fertilizer. Strictly speaking, a pH of 7 is a neutral pH; however, liquid fertilizers ($NH_3$—$H_3PO_4$—$H_2O$) such as the 8–24–0 and 7–21–0 grades are slightly acidic, but are considered by farmers and agronomists to be "neutral" liquid fertilizer formulations. A liquid fertilizer deviating greatly from a neutral pH has a corrosive effect on the equipment used in producing the liquid formulation and also on the storage equipment. Another factor to consider in the production of liquid fertilizers is the limit of solubility of the mono- and di-ammonium phosphate crystals under typical field conditions. A temperature of 32° F. is assumed to be the lowest safe temperature for practical field operations. A third factor which must be borne in mind is the extent of ammoniation to which the phosphoric acid is subjected. It has been determined that an equimolar mixture of mono- and di-ammonium phosphate has a greater solubility than any other mixture of the two salts or of either salt taken alone. Therefore, the greatest solubility is achieved by approaching equimolar ratios of the mono- and di-ammonium phosphate salts. The desired optimum $N:P_2O_5$ ratio appears to be in the range from about 0.28 to about 0.37; a liquid formulation which contains an $N:P_2O_5$ ratio smaller than 0.28 would be too acidic, corrosive, of too low solubility, and would possess a low plant food content. An $N:P_2O_5$ ratio greater than 0.38 would result in a liquid formulation which is low in plant food content, low solubility, and a liquid fertilizer product of undesirable ammonia vapor pressure. Thus, all factors considered, a liquid fertilizer formulation such as the 7–21–0, 8–24–0, and 8–25–0 grades have gained wide popularity since these grades possess most of the desirable features and a minimum of the undesirable factors.

My invention can be more clearly explained with reference to the accompanying figures which are shown for illustrative purposes and the figures are not to be construed as limiting the invention.

Figure 1 discloses the solubility isotherms in the system $NH_3$—$H_3PO_4$—$H_2O$ at various temperatures.

Figure 2:
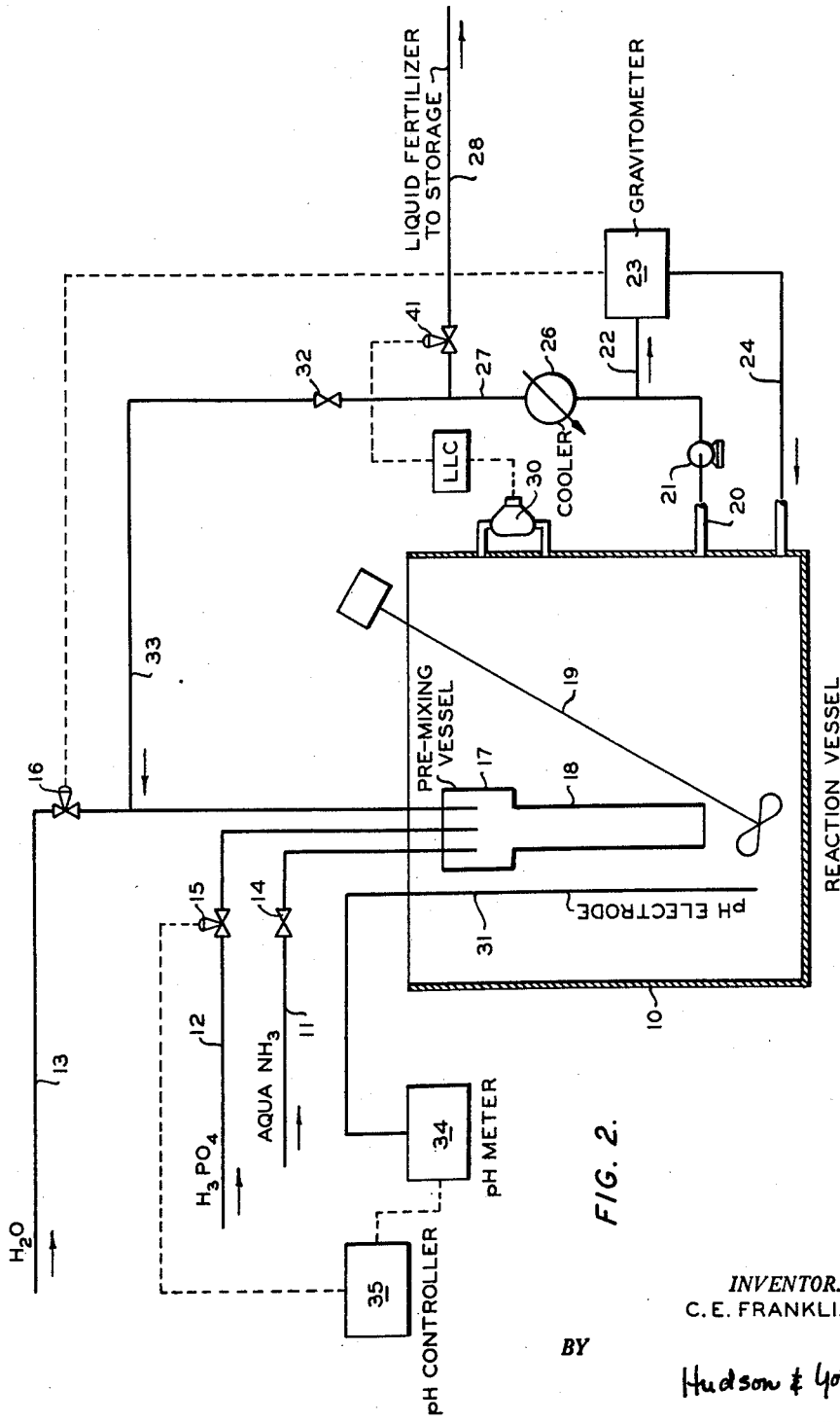

Figure 2 portrays diagrammatically one arrangement of equipment which can very advantageously be employed in carrying out the present invention.

Referring then to Figure 1, the solubility isotherms for the system $NH_3$—$H_3PO_4$—$H_2O$ have been plotted at 32° F., 77° F., 122° F., and 167° F. For convenience, double axes of ordinates are shown wherein percent nitrogen is plotted on one axis, and percent ammonia is plotted on the other. Likewise, double axes of abscissas are depicted with percent phosphorus pentoxide plotted on one abscissa axis, and percent phosphoric acid on the second abscissa axis. The area below any particular curve is a liquid phase, the area above is the region of crystal formation. The ammonia, phosphoric acid and water content of any liquid formulation, for example, an 8–24–0 grade, can be determined by quantitative analysis in the laboratory. However, if an operator wished to make a particular liquid formulation, one would be led to believe that he could merely charge fixed quantities of ammonia or aqua ammonia, phosphoric acid, and water into a reaction vessel, and the final product would be the liquid formulation desired. However, the reaction of ammonia and phosphoric acid is highly exothermic, and the reaction mixture temperature rises considerably resulting in appreciable loss of ammonia by evaporation. In addition, in the production of a liquid fertilizer comprising $NH_3$—$H_3PO_4$—$H_2O$, commercial phosphoric acid is employed, and consequently, the uniformity of concentration of the phosphoric acid will vary from batch to batch. As such, predetermined quantities of $H_3PO_4$ necessary to give a particular grade of liquid fertilizer will often be inaccurate. Moreover, in the production of a "neutral" liquid fertilizer such as an 8–24–0 grade it is desirable to maintain the ratio of nitrogen to $P_2O_5$ close to 1:3 to keep from forming crystals or balls of ammonium phosphate salts. This is difficult because the viscosity of the phosphoric acid varies considerably with the atmospheric temperature and consequently, it is very difficult to charge the phosphoric acid at a constant rate. When aqua ammonia is employed, the concentration of the aqua will also vary due to ammonia vapor losses encountered in producing said aqua. Ammonia losses also occur during the storage of the aqua ammonia. The highly exothermic nature of the reaction of ammonia and phosphoric acid necessitates controlling the temperature of the reaction mixture by suitable cooling means. Crystal formation readily occurs should the reaction effluent deviate from a neutral pH resulting in fouling of the equipment, crystal deposition on the cooling surfaces, and shut down of plant operation.

In my novel process and apparatus, I have found that by charging a fixed quantity of aqua ammonia of known concentration while simultaneously adjusting the rate of flow of phosphoric acid of known concentration so that the reaction mixture is maintained at a predetermined pH, a liquid formulation containing the desired ratio of components can be obtained. Alternatively, a fixed quantity of $H_3PO_4$ of known concentration can be charged to the reaction vessel, while the rate of flow of aqua ammonia is controlled in the manner explained above.

In general, a measured volume of water is charged to the reaction vessel prior to the charging of a fixed quantity of aqua ammonia of known concentration while simultaneously adjusting the rate of flow of phosphoric acid of known concentration so that the reaction mixture is maintained at a predetermined pH. The acidic and basic components employed would, of course, be at a concentration that it would be necessary to add a given volume of water to thus produce the liquid formulation desired, the added water generally being charged to the reaction vessel before the addition of the other ingredients.

Another modification of my invention is to charge ammonia or aqua ammonia while simultaneously adjusting the rate of flow of phosphoric acid so that the reaction mixture is maintained at a predetermined pH and the rate of flow of water so that the reaction mixture is maintained at a predetermined specific gravity, a liquid formulation containing the desired ratio of components can be obtained. Of course, it is understood that the water content of the aqua ammonia and phosphoric acid must be present in insufficient quantities and, consequently, additional water has to be added to the reaction mixture to obtain the desired liquid formulation. Alternatively, phosphoric acid can be charged to the reaction vessel while the rates of flow of ammonia or aqua ammonia are controlled in the manner explained above. Generally, a portion of the water is initially charged to the reaction vessel and subsequently the reagents are charged as noted supra.

I have found, quite surprisingly indeed, that 5–15–0, 6–18–0, 7–21–0, and 8–24–0 grades ($NH_3$—$H_3PO_4$—$H_2O$ system) have a pH which is practically constant. Table I below, gives the pH and specific gravity values for liquid systems wherein the ratio of N to $P_2O_5$ is 1:3.

TABLE I

| Formulation | pH | Specific Gravity, 60/60 F. |
|---|---|---|
| 8–24–0 | 6.85 | 1.269 |
| 7–21–0 | 6.85 | 1.225 |
| 6–18–0 | 6.85 | 1.193 |
| 5–15–0 | 6.86 | 1.161 |
| 4–12–0 | 6.90 | 1.128 |
| 3–9–0 | 6.95 | 1.103 |
| 2–6–0 | 6.99 | 1.063 |
| 1–3–0 | 7.08 | 1.031 |

Thus, it is readily apparent that if the pH of the reaction mixture is controlled at a predetermined pH of approximately 6.85 and at a predetermined specific gravity corresponding to the specific gravity of the liquid formulation desired, a liquid formulation of the 5–15–0, 6–18–0, 7–21–0, and 8–24–0 grades can be produced. These grades are known to the art as "neutral" fertilizers. In view of the limiting factors noted supra, an 8–24–0 grade possesses a cross-section of the advantages desired in a liquid formulation, i.e., optimum total plant food, maximum solubility of the mono- and di-ammonium phosphate crystals, practicality under typical field conditions, and the like.

Referring then to the schematic drawing shown in Figure 2, a clearer understanding of a preferred embodiment of my invention can be realized.

Aqua ammonia is introduced at a uniform rate via conduit 11 past valve 14 and into premixing vessel 17. Phosphoric acid and water are likewise charged to pre-reaction vessel 17 via conduits 12 and 13 past valves 15 and 16, respectively. The reaction mixture in vessel 17 flows through conduit 18 and into reaction vessel 10. Stirring means 19 continuously agitates the reaction mixture. The pH meter 34, having been set for a constant predetermined pH range, continuously monitors the pH of the reaction mixture in vessel 10 by means of pH electrode 31. When the pH of the reaction mixture falls below the predetermined pH, a first output signal from the pH meter 34 is sent to pH controller 35 whereby pH controller 35 actuates valve 15 to decrease the rate of flow of phosphoric acid into premixing vessel 17. Should the pH of the reaction mixture rise above the predetermined pH of said mixture, pH meter 34 provides a second signal to pH controller 35 which in turn actuates valve 15 to increase the flow of phosphoric acid. pH controllers and recorders, air-actuated valves, and liquid level meters are available on the market; note Minneapolis-Honeywell Bulletin entitled "pH and Conductivity Recorders and Controllers," catalogue 15–16, copyright 1951. The reaction mixture is withdrawn via conduit 20, through pump 21, cooler 26, conduit 27, past valve 32, through conduit 33, and into conduit 13. In this manner, reaction product is continuously cooled and recycled to the reaction vessel thereby maintaining the temperature of the reaction mixture above 32° F. and below about 160° F., i.e., the temperature where appreciable $NH_3$ vapor losses occur. The temperature of the reaction mixture is preferably maintained in the range from about 50° F. to about 150° F. A portion of the reaction mixture stream withdrawn to 20 is diverted through conduit 22 and into gravitometer 23. Should the reaction mixture rise above the predetermined specific gravity, gravitometer 23 will actuate valve 16 thereby increasing the flow of water through conduit 13. Thus, the specific gravity of the reaction mixture will be lowered due to the increased rate of flow of water into vessel 10. Accordingly, should the gravitometer indicate that the specific gravity of the reaction effluent is below the predetermined specific gravity, the gravitometer will thus actuate valve 16 to a closed position to reduce the rate of flow of water via conduit 13. Gravitometers which may be employed in my invention are well-known to the prior art; note, for example, application Serial No. 225,875, by Weller R. Pierce, filed May 11, 1951. Another applicable gravitometer is described in Bulletin 105, by the Ohmart Corporation, Cincinnati, Ohio. Therefore, when simultaneously controlling the pH of the reaction mixture and the specific gravity of the reaction mixture, it is readily apparent that the process is batch or continuous. When the reaction mixture rises above a designated level, liquid level controller 30 will actuate valve 41 in conduit 28 to an open position to draw off the product which can be used as desired.

To prepare an 8–24–0 liquid formulation, i.e., $NH_3$—$H_3PO_4$—$H_2O$ system, gaseous ammonia or aqua ammonia containing at least 15.6 weight percent NH₃ based on the aqua is employed. The concentration of the acidic component, H₃PO₄, is generally in the range from about 35.7 percent to about 100 percent. The particular concentrations of the acidic and basic ingredients chosen are such that additional water is necessary when operating in accordance with the embodiment disclosed in Figure 2. However, my invention is particularly applicable to NH₃—H₃PO₄—H₂O systems wherein fixed quantities of aqua ammonia and phosphoric acid of known concentrations (additional water may or may not be necessary) are charged to a reaction vessel wherein the rates of flow of the aqua and/or acid are controlled so as to maintain a constant predetermined pH of the reaction mixture in said reaction vessel. The advantages obtained from the practice of my invention are elimination of crystal formation in the cooling apparatus, use of carbon steel reactor in lieu of relatively expensive stainless steel reactor, ease of constructing the apparatus in various locales where demand is pressing, a liquid product void of crystals, and low initial construction cost and maintenance, etc.

*Example I*

Aqua ammonia (20 weight percent N), 75% phosphoric acid, and water are initially charged to a reaction vessel at a rate of 17.6, 11.5, and 6.2 gallons per minute, respectively, as shown in Figure 2. The reaction product is continuously monitored to maintain a predetermined pH of 6.85 and a specific gravity of 1.27; consequently the flow rates of the phosphoric acid and water are continually adjusted in relation to the predetermined pH and predetermined specific gravity of the reaction product. The reaction temperature is maintained between 50° to 150° F. by circulating a portion of the reaction mixture through an outside heat exchanger as described in conjunction with Figure 2. An 8–24–0 grade is produced. The process is operated continuously; however, a batch process is equally operable.

*Example II*

A calculated volume of water was added to the reaction vessel before aqua and phosphoric acid were added. A measured volume of aqua ammonia of a given concentration was delivered to the aqua conduit through which aqua passed into the reactor. Phosphoric acid was charged to the vessel through the acid conduit. A pH meter was used to measure the pH of the stirred liquid in the reactor. The flow of aqua ammonia was controlled by hand as was the rate of flow of phosphoric acid into the reaction vessel. The reaction mixture was circulated through the cooler and back into the reactor, thus maintaining the temperature of the mixture above 32° F. and below 160° F. By controlling the flow of aqua and phosphoric acid by hand and observing the pH meter reading, it was possible to maintain a pH between 6.8 and 6.9. When the total amount of aqua was introduced into the reactor, the flow of phosphoric acid into the reactor was stopped (the pH of the mixture being approximately 6.85). A 2800 gallon batch of liquid fertilizer was prepared in this manner and analyzed 8.0 weight percent nitrogen and 24.0 weight percent P₂O₅. The liquid formulation produced was an 8–24–0 grade.

A second batch of 1700 gallons of liquid fertilizer was prepared as above. This fertilizer analyzed 7.0 weight percent nitrogen and 21.0 weight percent P₂O₅, i.e., a 7–21–0 grade.

It will be apparent to those skilled in the art that various modifications and applications of the invention can be made upon study of the accompanying disclosure without departing from the spirit and scope of said disclosure.

I claim:

1. A continuous process for producing a liquid fertilizer having a predetermined nitrogen-phosphorous pentoxide-water ratio which comprises charging aqua ammonia of variable concentration containing at least 15.6 weight percent ammonia based on said aqua ammonia to said zone, charging phosphoric acid of variable concentration having a concentration in the range of about 35.7 percent to about 100 percent to said zone, automatically varying the rate of flow of said acid to said zone with respect to the rate of flow of said ammonia to said zones so as to maintain a completely liquid phase having a constant predetermined pH in said zone, adding water to said zone in a proportion so as to maintain a constant predetermined specific gravity of the contents in said zone, and recovering said liquid fertilizer.

2. The process of claim 1 wherein the temperature of said reaction mixture is maintained above the temperature at which crystal formation occurs and below the temperature at which appreciable ammonia vapor losses occur.

3. The process of claim 1 wherein the level of the contents in said reaction zone is maintained at a predetermined level.

4. The process of claim 3 wherein a portion of the reaction effluent is circulated through a cooling zone prior to recycling to said reaction zone.

5. The process of claim 4 wherein said water, aqua ammonia, and phosphoric acid are charged to a pre-mixing zone.

6. The process of claim 1 wherein the temperature of said reaction mixture is maintained between a range from about 32° F. to about 160° F.

7. The process of claim 6 wherein the predetermined pH is 6.85 and the liquid fertilizer is 8–24–0.

References Cited in the file of this patent

UNITED STATES PATENTS

| | | |
|---|---|---|
| 1,210,180 | Logan | Dec. 26, 1916 |
| 1,761,400 | Liljenroth | June 3, 1930 |
| 1,983,024 | Foss | Dec. 4, 1934 |
| 1,989,175 | Siems | Jan. 29, 1935 |
| 2,036,701 | Kircher et al. | Apr. 7, 1936 |
| 2,037,706 | Curtis | Apr. 21, 1936 |
| 2,707,676 | Picot et al. | May 3, 1955 |
| 2,781,612 | Dugan | Feb. 19, 1957 |
| 2,792,286 | Wordie et al. | May 17, 1957 |
| 2,799,569 | Wordie et al. | July 16, 1957 |
| 2,819,955 | Slot | Jan. 14, 1958 |

OTHER REFERENCES

Chemical Machinery, Emil R. Riegel, pages 554 to 556, Reinhold Publishing Corp., N.Y., 1944.